Oct. 3, 1961 R. S. WILLIAMS 3,002,692
THERMOSTATICALLY ACTUATED SIGNAL
TRANSMITTING CONVERTERS
Filed April 22, 1959
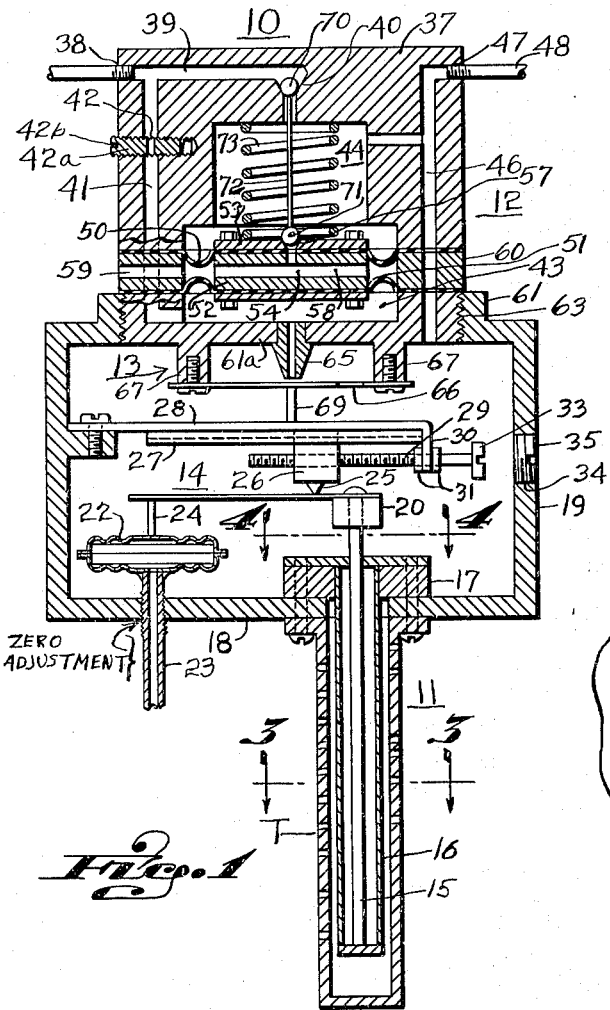
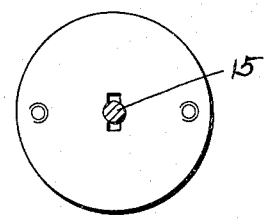
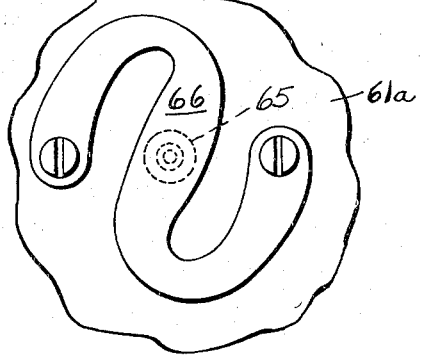
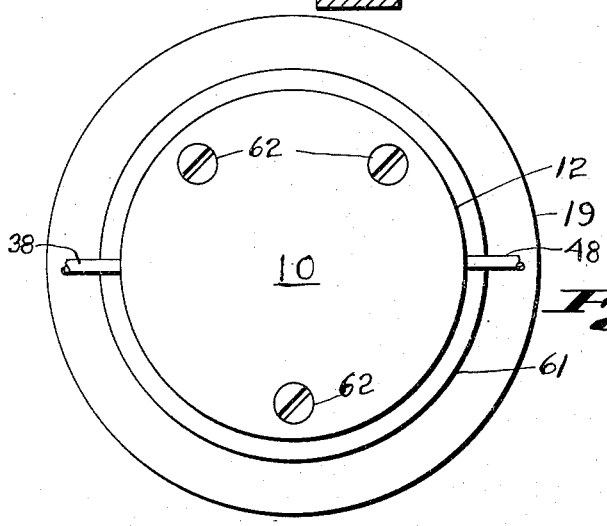

United States Patent Office 3,002,692
Patented Oct. 3, 1961

3,002,692
THERMOSTATICALLY ACTUATED SIGNAL TRANSMITTING CONVERTERS
Ray S. Williams, Orrville, Ohio, assignor to Hagan Chemicals & Controls, Inc., Pittsburgh, Pa., a corporation of Pennsylvania
Filed Apr. 22, 1959, Ser. No. 808,250
5 Claims. (Cl. 236—82)

This invention relates to thermostatically actuated pneumatic signal converter transmitters.

An object of the invention is to provide a pneumatic signal transmitting converter having a differential thermally responsive element, a sensitive and accurate pneumatic signal converter transmitter and a mechanism responsive to the signal as feed-back for so stabilizing the transmitter that the signal output and the temperature changes, to which it responds, vary one with the other.

A further object of this invention is to provide a converter transmitter having a feed-back mechanism for magnifying the ratio of motion to temperature change of the thermostatic element, and which may be supplied with a bias signal to modify that output signal range with reference to the temperature change range.

Other objects of the invention will be apparent to those of ordinary skill in the art to which the invention pertains, from the following description taken in conjunction with the accompanying drawings.

In the drawings:

FIGURE 1 is a view in vertical section of the thermostatically actuated converter transmitter embodying a form of the invention;

FIG. 2 is a top plan view thereof;

FIGS 3 and 4 are views in section taken on lines 3—3 and 4—4, respectively, of FIG. 1;

FIG. 5 is a plan view of a flap spring embodied in the device of FIG. 1; and

FIG. 6 is an enlarged plan view of an orifice screw embodied in the device of FIG. 1.

In the drawings, a thermostatically actuated pneumatic converter transmitter 10 is shown that comprises a thermostatic element 11 of the differential type, a pneumatic converter transmitter 12, a converter transmitter actuating means 13 and a feed-back means 14.

The thermostatic element 11 comprises a member 15 having a substantially zero or a very low temperature coefficient of expansion and a member 16 having preferably a linear temperature coefficient of expansion. As shown, the member 15 comprises a rod disposed within member 16 which may be in the form of a tube. The rod 15 is rigidly connected at its lower end to the lower end of the tube 16.

The upper end of the thermo-expansive tube 16 is secured to a flange 17 secured to the bottom wall 18 of a feed-back chamber housing 19. The upper end of the relatively non-expansive member 15 is attached to a block 20 provided with a feed-back cantilever spring 21. Motion of the rod 15 is transmitted to the actuating means 13 by which actuating pressure or power is developed for the pneumatic converter transmitter 12, as will be explained infra.

The thermostat 11 may be disposed in a protective tube T which may also be provided with suitable means for mounting the device on a pipe or other apparatus containing a medium whose temperature is to be regulated. The tube T may be omitted in which case the housing of device 10 may be provided with suitable mounting means, as will be understood by those skilled in this art.

The feed-back means 14 comprises a hollow bellows member supported by a tube 23 extending through the wall 18 of the housing 19. The member 22 is provided with a pusher stem 24 that engages the free end of the spring 21.

The spring 21 engages a fulcrum 25 carried by a block 26. The block 26 is slidably mounted on spaced flanges 27 carried by a cantilever member 28 which is a part of the actuating feed-back means 14 and provides the control for the actuating means 13.

The block 26 is actuatable along the member 28 by means of a screw 29 carried by a flange 30 at the free end of member 28. That screw 29 is provided with stop collars 31 to prevent lengthwise movement of the screw. The screw is provided with a head 33 having a screw driver slot therein whereby adjustment of the position of the fulcrum 25 may be accomplished through an access opening 34 which is normally closed by a screw plug 35 in the wall of the housing 19 as shown.

The converter transmitter 12 comprises a body 37 having a supply port 38 and a passage 39 leading therefrom to an inlet port valve seat 40 and by a passage 41 in which is disposed an orifice 42, to a chamber 43, in which the operating pressure for the transmitter is established. The body 37 is also provided with a pressure chamber 44 having an outlet passage 45 leading to a passage 46. One end of the passage 46 leads to an outlet port 47 to which a sending or transmitting line 48 is connected, while the other end leads into the feed-back chamber of the housing 19.

The orifice 42, as shown in FIG. 6, may be formed in a screw 42a having a diameter sufficient to block passage 41. By placing the screw driver slot 42b in a vertical position, one can always tell when the orifice is in alignment with the passage 41.

The transmitter 12 includes a pair of spaced diaphragms 50 and 51 extending across the opposite sides of a rigid member 52. The central portions of these diaphragms are secured by plates 53 and 54 to the member 52 so as to clamp the same thereto in a pressure-tight manner. The clamping member 54 is provided with an exhaust port seat 57 that leads through a passage 58 in the member 52 into the space between the diaphragms. That space communicates with the atmosphere by a passage 59 in a spacer 60 that spaces the diaphragms at the marginal edges thereof. The body 37 rests on the spacer 60 and it in turn rests on a flange 61 of a cup-shaped member 61a that forms with the diaphragm 51 the chamber 43. The body 37 and the spacer 60 are rigidly secured together by means of bolts 62.

The member 61a may be secured to the housing 19 by a threaded connection 63. That connection is such as to provide a pressure-tight joint.

The pressure in the chamber 43 is controlled by a jet 65 that provides communication between the chamber 43 and the feed-back chamber of housing 19. The tip of the jet 65 is controlled by a flap 66. The flap 66 may be in the form of an S-shaped spring mounted at its ends to bosses 67, as shown. Motion of the cantilever 28 is transmitted to the S-shaped spring 66 by means of a pin 69 carried by the former.

The inlet port 40 and the exhaust port 57 are controlled respectively by valve members 70 and 71, illustrated as being substantially spherical, carried at the ends of a stem 72.

The diaphragm assembly, of which the diaphragms 50 and 51 are a part, may be biased downwardly by a light spring 74 so as to urge the valve ball 70 towards the seat 40.

It is to be understood that when device 10 is placed in operation to control, measure, or measure and control temperature, that the mid point of the output range of signals in the transmission or sending line 48 will represent the control temperature point of the device. If the temperature falls below that point, the signals increase in value, and decrease in value as the temperature rises above the control point. If the device is used only for the purpose of measuring temperature over the range of the device, the signals would be impressed on a recorder (not shown) as will be readily understood by those skilled in the art.

Motion of the thermostatic member 15, in response to increasing temperatures, results in downward motion of the block 20 at the upper end of the rod 15. That motion being transmitted by member 21 through the fulcrum block 26, relieves the upward force on the cantilever 28, so that the pressure on the spring flap 66 is released causing it to move away from the tip of the jet 65 thereby decreasing the resistance to flow of air through the jet into the feed-back chamber. As the flow is increased, the pressure drop across the orifice 42 is increased which results in a decrease in pressure in the chamber 43. That decrease in pressure causes the diaphragms to move downwardly to seat the valve 70 on the inlet port 40, valve 71 leaves exhaust port 57 which is open to the atmosphere through passage 59 thereby decreasing the pressure in the valve body chamber 44. That decreased pressure is transmitted to the sending line 48 and into the feed-back chamber of housing 19 where it acts to relieve the bellows member 22. As the pressure on bellows 22 is relieved, it expands, causing fulcrum block 26 to be raised, whereupon the flap 66 is moved toward the tip of the jet 65, allowing less air to escape into the diaphragm chamber and decreasing the pressure drop across the orifice 42. The pressure in the chamber 43 therefore rises, causing the diaphragm assembly to move upwardly to close the exhaust port 57 and uncover the inlet port 40. When a balance has ben reached between the force of the pressure in chamber 44 and the force of the spring 74 on the one hand and the opposing force of the pressure in chamber 43 on the other, valves 70 and 71 will close their respective ports. Thus as the thermoelement 11 expands or contracts with temperature, the flap 66 will be so positioned with respect to the tip of jet 65 that the output pressure of the converter transmitter will vary above or below the regulated point as required by the conditions to which the thermoelements respond.

The ratio of the range of the output pressures in the transmission line 48 to the range of temperature change to which the thermostatic element 16 responds may be modified by supplying the interior of the bellows 22 with a bias or set point pressure. That pressure is admitted through the tube 23 and may be controlled from a point remote from or near to the device 10. If a pressure is supplied to the interior of the bellows 22, that pressure tends to bias the flap 66 to a position closer to the tip of the jet 65 causing a higher range of pressure to be established in the sending or transmission line 48 for a given temperature to which the thermostatic element responds than when the pressure in the bellows is that of atmospheric. It also follows that the pressure in the bellows 22 may be below atmospheric, if desired.

The increment motion of the cantilever 28 and the flap 66 may be increased per increment of change in length of the thermostatic member 16 by shifting the block 26 towards the fixed end of the cantilever 28. In like manner, the amount of motion of the flap 66 per degree of temperature change of member 16 may be decreased by moving the block towards the free end of cantilever 28.

Because of the positive bias provided by the spring in the chamber 44 of the valve body, the device must maintain in the chamber 43 a pressure which is always higher than the pressure in the chamber of the housing 19. Thus, a minimum pressure drop across the orifice or jet 65 is assured. In other words, the pressure in chamber 43 will always be such as to prevent the feed-back of pressure from the feed-back chamber of housing 16 into the chamber 43.

The device illustrated and described may be manufactured as a compact unit of small size. But even so, it is sensitive and capable of transmitting pressures of substantial magnitude and of substantial range. For example, the pressure range in the transmission line 48 may vary from 0 p.s.i.g. to 30 or more p.s.i.g. The device is quick in response and sensitive to extremely small changes in pressure.

Having thus described an embodiment of the invention, it will be apparent to those of ordinary skill in the art to which the invention pertains, that various changes may be made without departing from the spirit or scope of the invention.

Therefore, what is claimed as new and desired to be secured by Letters Patent is:

1. A thermostatically actuated pneumatic converter comprising, in combination, a diaphragm valve assembly including a valve body having a valve signal chamber, and a valve actuating pressure chamber, a common diaphragm assembly separating said chambers, said body having a pressure supply port, a valve port communicating said supply port with body chamber and a passage having an orifice therein communicating the supply port with said valve actuating pressure chamber, and a signal sending passageway leading out of said valve body signal chamber, said diaphragm assembly having an exhaust valve port communicating said valve body chamber to the atmosphere, a housing having a feed-back chamber, said diaphragm valve assembly having a passage leading from said output signal passage to said feed-back chamber, a jet communicating said actuating pressure chamber with said feed-back chamber, a flap adjacent to the tip of said jet for controlling flow therethrough, a differential thermostat associated with said feed-back housing and forming a pressure-tight joint therewith, said thermostat having relatively thermally expansive and non-thermally expansive members providing relative motion between them in response to temperature changes, one of said members being operatively connected to actuate said jet flap towards or away from said jet, and means responsive to the pressure in said feed-back chamber for actuating said jet flap in a direction opposite to that in which it was moved by said differential thermostat, the signal output pressure of the valve increasing as the flap moves towards the jet and decreasing as the flap moves away from the same which comprises a cantilever member supported at one end by one of the thermostatic members and at the other by a feed-back pressure responsive member comprising a hollow pressure deflectable member, a fulcrum and a cantilever supported at one end on said fulcrum and at the other end by a fulcrum member resting on said first-mentioned cantilever member, said second-mentioned cantilever being provided with means for actuating said jet flap.

2. A combination as in claim 1 in which the fulcrum member is adjustably supported by said second-mentioned cantilever and that means are provided for adjusting the same towards or away from said fulcrum, to thereby change the ratio of the motion of the movable member of the thermostat to the motion of the jet flap.

3. A thermostatically actuated pneumatic converter comprising, in combination, a diaphragm valve assembly including a valve body having a valve signal chamber, and a valve actuating pressure chamber, a common diaphragm assembly separating said chambers, said body having a pressure supply port, a valve port communicating said supply port with body chamber and a passage having an orifice therein communicating the supply port with said valve actuating pressure chamber, and a signal sending passageway leading out of said valve body signal chamber, said diaphragm assembly having an exhaust valve port communicating said valve body chamber to the atmosphere, a housing having a feed-back chamber, said diaphragm valve assembly having a passage leading from said output signal passage to said feed-back chamber, a jet communicating said actuating pressure chamber with said feed-back chamber, a flap adjacent to the tip of said jet for controlling flow therethrough, a differential thermostat associated with said feed-back housing and forming a pressure-tight joint therewith, said thermostat having relatively thermally expansive and non-thermally expansive members providing relative motion between them in response to temperature changes, one of said members being operatively connected to actuate said jet flap towards or away from said jet, and feed-back responsive means responsive to the pressure in said feed-back chamber for actuating said jet flap in a direction opposite to that in which it was moved by said differential thermostat, the signal output pressure of the valve increasing as the flap moves towards the jet and decreasing as the flap moves away from the same, said feed-back responsive means comprising a hollow, flexible bellows having a tubular member supporting it in said housing and providing communication between the interior of said bellows with the exterior of the housing, and the operative connection with said bellows being a cantilever adjustably connected to the bellows and carried by the movable member of said thermostat for providing a zero adjustment for the device, said bellows being adapted to receive a set point pressure on its interior whereby the feed-back action of the bellows is made proportional to the difference between the pressure in the feed-back chamber and the set point pressure.

4. A device as in claim 1 in which the signal chamber of the valve body is provided with a compression spring resting on the diaphragm assembly by which is established a positive pressure drop across said jet so that the pressure in the valve actuating chamber will always exceed the pressure in the feed-back chamber.

5. A thermostatically actuated pneumatic converter comprising, in combination, a diaphragm valve assembly including a valve body having a valve signal chamber, and a valve actuating pressure chamber, a common diaphragm assembly separating said chambers, said body having a pressure supply port, a valve port communicating said supply port with body chamber and a passage having an orifice therein communicating the supply port with said valve actuating pressure chamber, and a signal sending passageway leading out of said valve body signal chamber, said diaphragm assembly having an exhaust valve port communicating said valve body chamber to the atmosphere, a housing having a feed-back chamber, said diaphragm valve assembly having a passage leading from said output signal passage to said feed-back chamber, a jet communicating said actuating pressure chamber with said feed-back chamber, a flap adjacent to the tip of said jet for controlling flow therethrough, a differential thermostat associated with said feed-back housing and forming a pressure-tight joint therewith, said thermostat having relatively thermally expansive and non-thermally expansive members providing relative motion between them in response to temperature changes, one of said members being operatively connected to actuate said jet flap towards or away from said jet, and a cantilever member supported at one end by one of the thermostatic members and at the other by a feed-back pressure responsive member, said cantilever member actuating said jet flap in a direction opposite to that in which it was moved by said differential thermostat, the signal output pressure of the valve increasing as the flap moves towards the jet and decreasing as the flap moves away from the same and said feed-back responsive member comprising a hollow, flexible bellows having a tubular member supporting it in said housing and providing communication between the interior of said bellows with the exterior of the housing and the operative connection with said bellows being adjustably connected to the bellows and carried by the movable member of said thermostat for providing a zero adjustment for the device, said bellows being adapted to receive a set point pressure on its interior whereby the feed-back action of the bellows is made proportional to the difference between the pressure in the feed-back chamber and the set point pressure.

References Cited in the file of this patent

UNITED STATES PATENTS

| | | |
|---|---|---|
| 2,099,643 | Werring | Nov. 16, 1937 |
| 2,411,295 | Saballus | Nov. 19, 1946 |
| 2,517,051 | Swenson | Aug. 1, 1950 |
| 2,742,916 | Side | Apr. 24, 1956 |

FOREIGN PATENTS

| | | |
|---|---|---|
| 80,010 | Denmark | Oct. 17, 1955 |

OTHER REFERENCES

Moore: pgs. 598–603, Instruments Magazine for September, 1945.